United States Patent [19]

Breglia et al.

[11] 4,411,627
[45] Oct. 25, 1983

[54] ARTICULATED LIGHT GUIDE

[75] Inventors: Denis R. Breglia, Altamonte Springs; Frank J. Oharek, Maitland; Paul D. Grimmer, Winter Park, all of Fla.

[73] Assignee: The United States of America as represented by the Secretary of the Navy, Washington, D.C.

[21] Appl. No.: 343,682

[22] Filed: Jan. 28, 1982

[51] Int. Cl.³ .............................................. G09B 9/08
[52] U.S. Cl. ..................................... 434/44; 358/104
[58] Field of Search ................. 434/16, 21, 22, 29, 434/44; 358/104

[56] References Cited

U.S. PATENT DOCUMENTS

| | | | |
|---|---|---|---|
| 3,205,303 | 9/1965 | Bradley | 434/44 |
| 3,283,418 | 11/1966 | Brewer et al. | 434/69 |
| 3,367,046 | 2/1968 | Neuberger | 434/44 |
| 3,459,465 | 8/1969 | Rosin et al. | 434/44 |
| 3,811,204 | 5/1974 | Marshall et al. | 434/22 |
| 3,892,051 | 7/1975 | Bunker | 358/104 |
| 4,048,653 | 9/1977 | Spooner | 434/44 |
| 4,100,571 | 7/1978 | Dykes et al. | 434/44 |
| 4,103,435 | 8/1978 | Herndon | 434/44 |

Primary Examiner—Vance Y. Hum
Assistant Examiner—Leo P. Picard
Attorney, Agent, or Firm—Robert F. Beers; Robert W. Adams; Robert J. Veal

[57] ABSTRACT

An articulated light guide having internal mirrors and rotatable joints, provides a transmission path to a helmet mounted projector wherefrom light is transmitted onto a retroreflective screen to produce images utilized in simulation training. Located at the screen are photodiodes which detect the orientation of said images with respect to a reference and provide alignment signals to a servo-controlled image rotation device.

6 Claims, 3 Drawing Figures

ARTICULATED LIGHT GUIDE

FIELD OF THE INVENTION

The present invention relates to visual display apparatus and particularly to head coupled apparatus for providing a visual display to an observer such as seen from a moving perspective point. More particularly, the present device relates to apparatus for sensing the orientation of the images generated by such a visual display apparatus, when they are projected on a screen, and then orienting the images with respect to a known reference.

DESCRIPTION OF THE PRIOR ART

There have been devised a number of visual display apparatuses for use in training personnel such as pilots and aircrew members. A number of these incorporate axial rotation sensors to determine head position and thus image orientation. These are best suited for applications wherein the image plane is fixed with respect to the observer's head, such as in U.S. Pat. No. 3,205,303 to Bradley. Additionally, such sensors mounted on the observer's head can cause mechanical and electromechanical complications in operation and calibration.

SUMMARY OF THE INVENTION

The present invention represents an improvement in the field of visual display apparatus, in that it provides a means for sensing the orientation of the image directly on the image screen and then orienting the image in accordance with a predetermined reference, such as the horizon. The invention is to be used in conjunction with a computer image generating means which utilizes a plurality of scan lines to form the image at the image screen. The computer generated image is communicated to a helmet mounted projector which positions the image on an image screen. Imbedded in the screen is an array of photodiodes which sense the orientation of the scan lines and output electrical signals which are used to determine the degree of correction or compensation required to align the scan lines with the chosen reference. An image rotating means is utilized to accomplish the desired correction.

DESCRIPTION OF A PREFERRED EMBODIMENT

Figure 1:
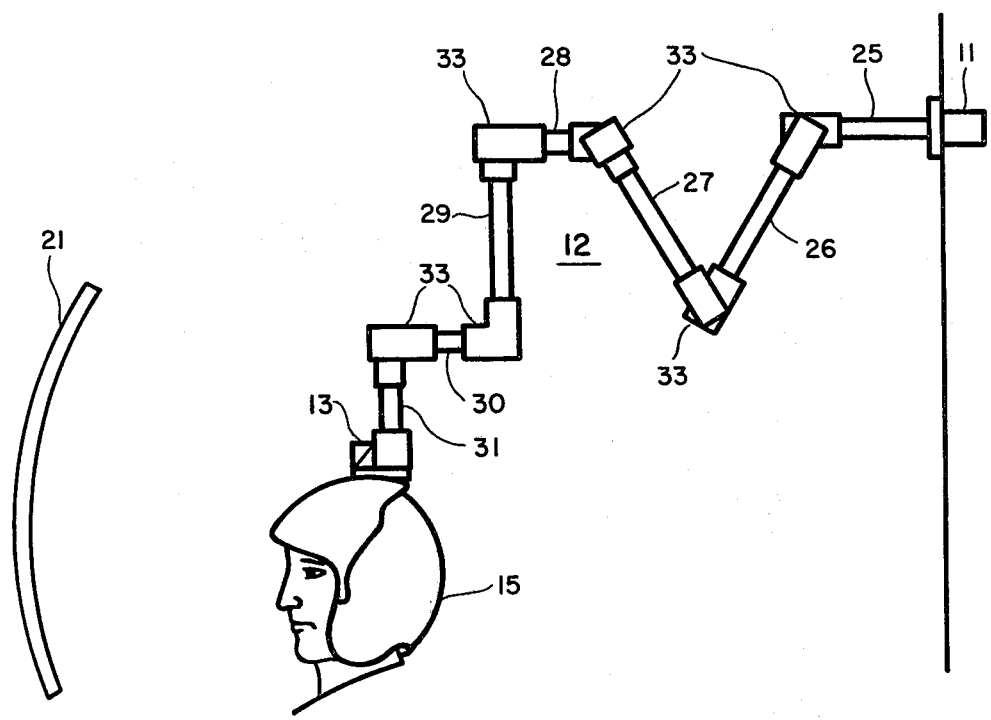
FIG. 1 shows an articulated light guide for communication with a helmet mounted projector in conjunction with an imaging screen.

FIG. 1 discloses the present invention in an embodiment wherein a computer image generator serves as light source 11 which generates an image utilizing a plurality of scan lines. An articulated light guide 12 is employed as a communicating means for conveying said image to a projector apparatus 13 mounted atop a helmet 15 to be worn by an observer 16. Projector apparatus 13 is a wide angle lens suitably selected to project said light data across the desired field of view onto a retroreflective screen 21.

Articulated light guide 12 employs a plurality of link elements 25 through 31, which are constructed of a light weight material such as plastic, each link element being connected to an adjacent element by a joint element 33. Each joint element 33 forms a fixed predetermined angle, the light data being deflected through this angle by an internal mirror 39. Optimally, mirror 39 will be set at a 45° angle to the incident light data. Mirror 39 can be adjusted by three screws 42, 43, and 44.

Figure 2:
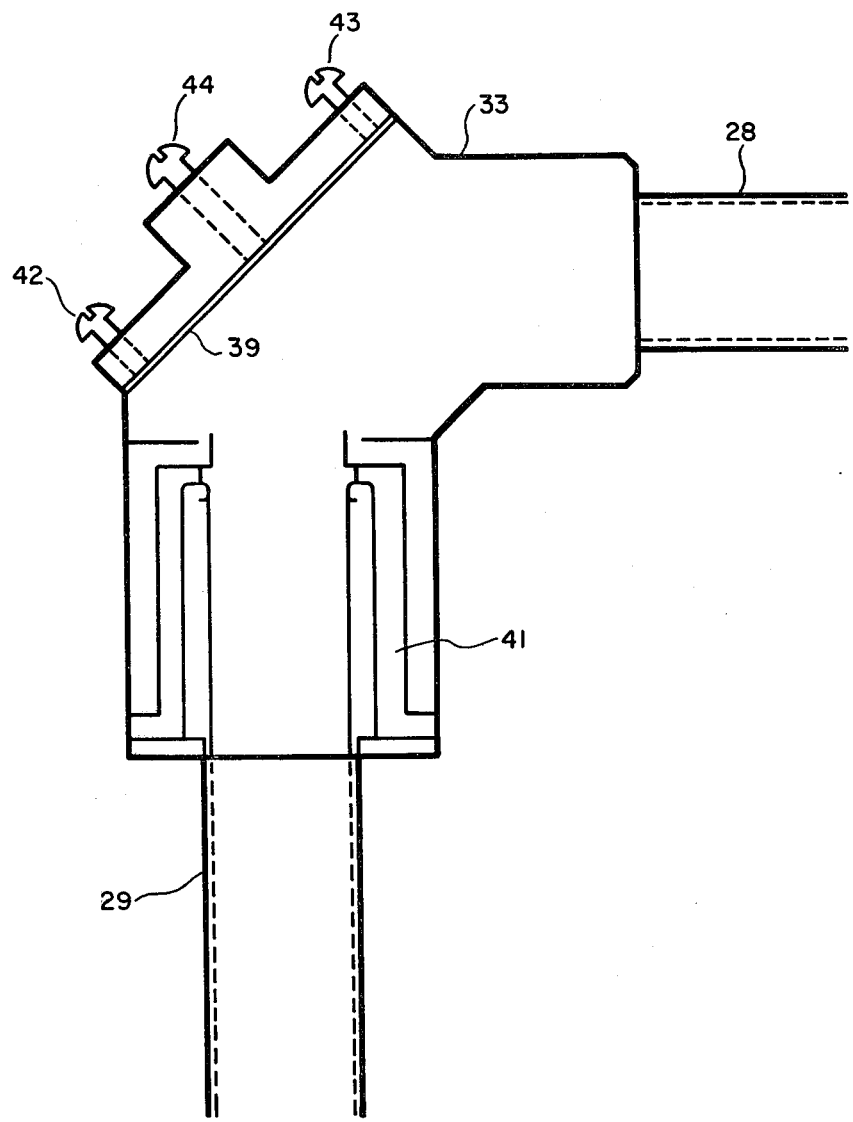
FIG. 2 is an interior view of the joint elements.
Figure 3:
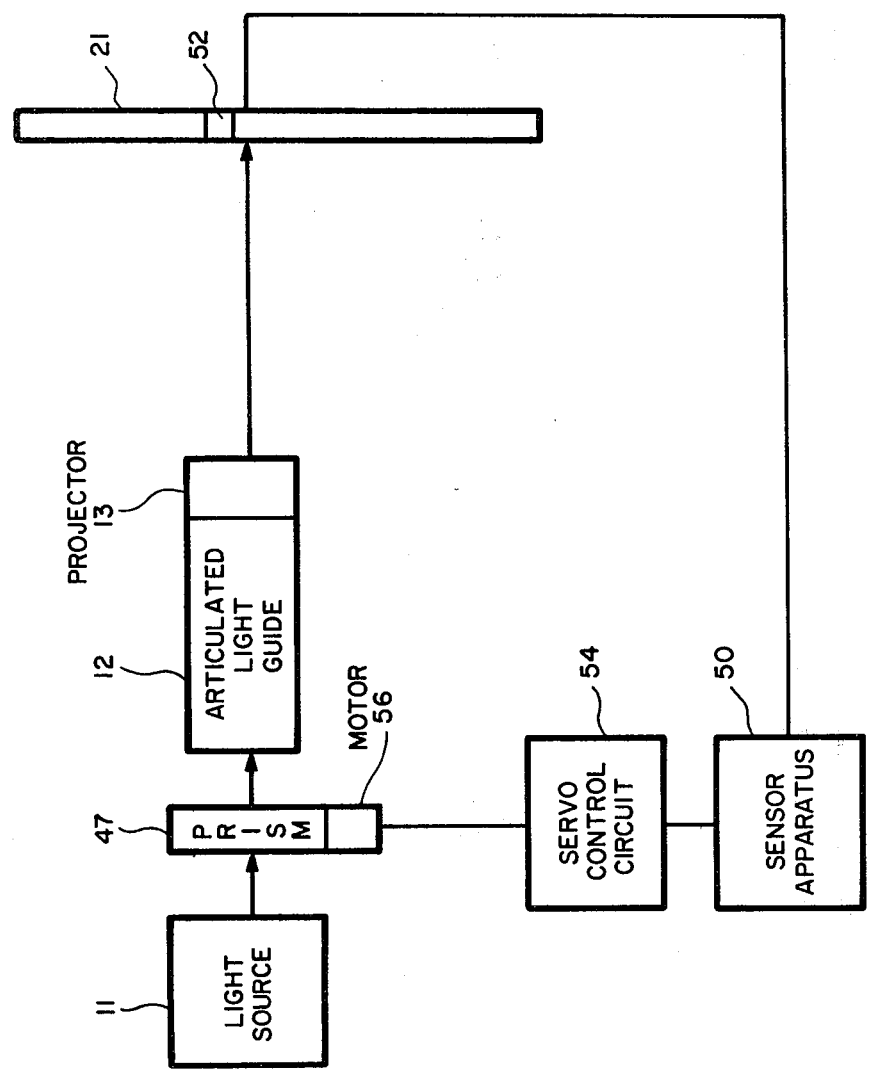
FIG. 3 is a block diagram of the system components.

Referring to FIG. 2, there is shown a typical joint element 33 having coupled thereto link elements 28 and 29. Link element 28 is fixedly coupled to joint element 33, while link element 29 is rotatably coupled to joint element 33. A bearing element 41 is attached to link element 29 so as to allow the rotation of link element 29 within joint element 33.

Transmission of light data through communicating means 12 distorts the data such that a visual image appearing on screen 21 will not be properly oriented.

To compensate for this distortion problem, each scan line output by light source 11 is monitored by a sensor apparatus 50 utilizing a plurality of photodetectors 52 embedded in screen 21. Sensor apparatus 50 determines the orientation of each scan line relevant to the horizontal plane. A number of commercial systems are available which have this capability, one such apparatus being the UDT 131A non-contact optical displacement system, manufactured by United Detector Technology, Inc.

The orientation information thus provided is utilized as an input to a servo control electronics circuit 54 which directs a servo motor 56 to rotate a dove prism 47 located at the output of light source 11. Prism 47 is rotated to orient the scan lines provided by light source 11 in the horizontal direction at image surface 21. This novel combination provides a closed loop feedback system dependent on the actual orientation of the scan lines as output by the light guide, rather than on positional estimates as heretofore used.

Operationally, lightweight articulated light guide 12 provides a minimally restrictive transmission path for light data from light source 11 through prism 47 to projector apparatus 13, which broadcasts the light data onto retroreflective screen 21 where sensor apparatus 50 determines the orientation of said data with respect to the horizon. This orientation information is used to rotate prism 47 to align the light data in the preferred direction.

While a preferred embodiment has been shown and described, various modifications and substitutions may be made thereto without departing from the spirit and scope of the invention. Accordingly, it will be understood that the present invention has been described by way of illustration and not limitation.

What is claimed is:

1. An improved articulated light guide system for transmitting a plurality of computer generated scan lines onto a screen from a helmet mounted projector in a predetermined orientation, comprising:
   means for communicating light from said helmet mounted projector to said screen;
   means for sensing the orientation of said light at said screen and outputting a corresponding signal;
   means for adjusting the orientation of said light in accordance with a signal received from said sensing means.

2. A light guide system according to claim 1, wherein said communicating means comprises:
   a plurality of linking members;
   a plurality of joint members each attached between said linking members;

bearing means between selected joint and linking elements; adjustable mirrors mounted within said joint elements; and a projecting means for retransmitting said light to said screen.

3. A light guide system according to claim 1, wherein said communicating means is an articulated light guide having a plurality of link elements rotatably connected for three dimensional movement by a plurality of joint elements containing mirrors, and having a projection means attached to the element most remote from said source.

4. A light guide system according to claim 3, wherein said sensing means comprises a non-contact optical displacement system capable of determining the orientation of said scan lines.

5. A light guide system according to claim 1, wherein said sensing means comprises:

photodetecting means designed for position sensing outputting a signal in accordance with light incident thereupon; and computational means for determining the orientation of said scan lines with respect to a horizontal reference connected to receive data output by said photodetecting means and outputting a signal in accordance with said orientation to said adjusting means.

6. A light guide system according to claims 1 or 4, wherein said adjusting means comprises:

a dove prism operably mounted between said light and said communicating means;

an electronics servo control circuit for converting said signal received from said sensing means into a servo drive signal and outputting said drive signal;

a servo motor operably attached to said prism for rotating said prism in accordance with drive signals received from said servo control circuit.

* * * * *